United States Patent [19]

Mambelli

[11] Patent Number: 4,545,450

[45] Date of Patent: Oct. 8, 1985

[54] MULTIPURPOSE EXTERNALLY CONTROLLED DEVICE

[75] Inventor: Giancarlo Mambelli, Viale Bologna, Italy

[73] Assignee: Motomec S.r.l., Longiano, Italy

[21] Appl. No.: 560,805

[22] Filed: Dec. 13, 1983

[30] Foreign Application Priority Data

Dec. 17, 1982 [IT] Italy ................. 5158/82[U]

[51] Int. Cl.⁴ ............................................ B62K 15/00
[52] U.S. Cl. ................... 180/53.1; 180/208; 280/278; 280/287
[58] Field of Search ............... 180/53.1, 208; 280/278, 280/287

[56] References Cited

U.S. PATENT DOCUMENTS

| | | | |
|---|---|---|---|
| 2,792,900 | 5/1957 | Howard | 180/53.1 |
| 3,282,365 | 11/1966 | McReynolds | 180/208 |
| 3,513,926 | 5/1970 | Paget, Jr. | 280/287 |
| 3,602,321 | 8/1971 | Kortschaga et al. | 180/53.1 |
| 3,757,882 | 9/1973 | Honda | 280/287 |
| 3,872,944 | 3/1975 | Shapiro | 280/287 |
| 4,037,678 | 7/1977 | Braune | 280/287 |

Primary Examiner—Richard A. Bertsch
Attorney, Agent, or Firm—Balogh, Osann, Kramer, Dvorak, Genova & Traub

[57] ABSTRACT

A multipurpose externally controlled device that comprises an alternator, a compressor, and a centrifugal pump. The external power takeoff of the engine assembly provides, through a flexible transmission cable, motion to the shaft of the alternator. This, in turn, passes on rotary motion alternately to the shaft of the compressor or to that of the centrifugal pump via, for example, transmission elements keyed to the shaft of the alternator and motion receiving elements fixedly mounted on the shaft of the compressor and on that of the centrifugal pump. This operation is controlled by a lever extending outside the casing of the device.

3 Claims, 2 Drawing Figures

MULTIPURPOSE EXTERNALLY CONTROLLED DEVICE

BACKGROUND OF THE INVENTION

The invention relates to a multipurpose externally controlled device comprising an alternator, a compressor and a centrifugal pump.

DESCRIPTION OF THE PRIOR ART

The importance is known of always having available, both for caravaning (with campers or towed caravans) and for pleasure craft, an alternator or at any rate a electrical machine for generating voltage, a centrifugal pump and an air compressor. To have available a light motorbike, preferably one that folds to make it easier to store it on board, can be considered equally important.

The said requirements are, however, the cause of difficulty arising in finding suitable places for the various machines and necessitate there being an autonomous motor with which to supply the necessary mechanical energy to the machines in question.

SUMMARY OF THE INVENTION

The object of the invention is to overcome the above mentioned problems through the utilization of the said three machines (alternator, centrifugal pump and compressor) is one single device powered by the engine of a suitably adapted light motorbike.

This offers an obvious advantage of not only a financial but also of a practical nature, since the device is less bulky, lighter in weight, easier to handle and can be stored in the most satisfactory way.

BRIEF DESCRIPTION OF THE DRAWINGS

Further characteristics and advantages of the multipurpose device according to the invention will become more obvious from the detailed description that follows, illustrated by way of an example on the accompanying drawing, in which.

DESCRIPTION OF THE PREFERRED EMBODIMENT

Figures 1, 2:
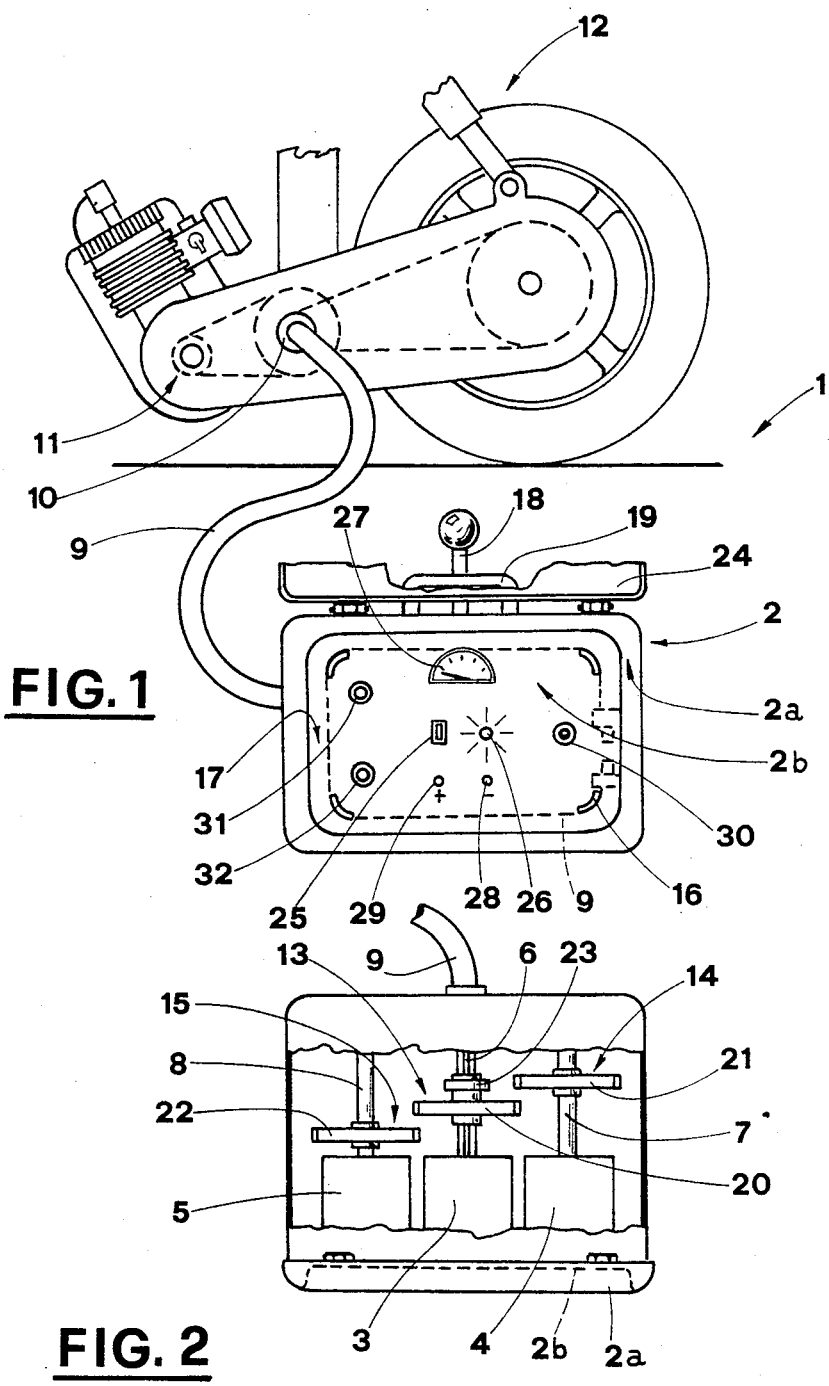
FIG. 1 shows the multipurpose group in question connected to the power takeoff of a light motorbike.
FIG. 2 shows, in a cutaway view seen from above, the said device.

With reference to the accompanying figures, the multipurpose device, shown at 1, comprises a casing 2 that can be carried by means of a handgrip 19 and, in the instance described herein, contains an alternator 3, a compressor 4 and a centrigual pump 5, suitably arranged therein to form one single device which, through a flexible transmission cable 9, is given mechanical energy by a power takeoff 10 fitted to the engine assembly 11 of a light motorbike 12 (FIG. 1).

The shaft 6, herein considered to be splined, of the alternator 3 is directly connected to the flexible cable 9. To the said shaft 6 are keyed means 13 for passing the rotary motion alternately onto the corresponding elements 14 and 15 that receive the rotary motion and are fixedly mounted on the shaft 7 of the compressor 4 and on the shaft 8 of the pump 5, respectively.

In particular, in the accompanying figures the transmission means 13 are constituted by an ordinary gear wheel 20 which, through a lever 18 movable from the outside of the casing 2, can be displaced from the neutral position destined for the operation of the alternator 3, in order to actuate the elements 14 and 15 which, in the case in question, are also constituted by gear wheels, as can be clearly seen in FIG. 2 in a cutaway view, numbered 21 and 22, respectively.

For greater clarity, it should be noted that the lever 18, through any type of means in themselves known, exerts an effect on the sleeve 23 integral with the gear wheel 20. Therefore, by displacing the lever 18 in one direction, the coupling is effected of the gear wheel 20 with, for example, the gear wheel 21 and vice versa.

It is obvious that the connection between the shaft 6 and the shafts 7 and 8 for the transmission of the motion can also be made in a different way from that described without in any way altering the concepts of the invention.

For example, the three gear wheels 20, 21 and 22 could be replaced with straight bevel gears or else mesh constantly, with the lever 18 permitting the displacement of keys with which is render one of the said shafts integral with the gear wheel concerned. Alternatively, the use could be envisaged of a first disk keyed to the shaft 6 of the alternator and of corresponding disks, facing the first disk, fixedly mounted on the shaft 7 and on the shaft 8. The transmission of the motion from the shaft 6 to the other shafts would be ensured by the engagement of a strong friction wheel on an axis parallel to the disks, that can be interposed between the disk of the shaft 6 and one of the other two disks alternatively. In this case, simply by varying the position of the said wheel, it would be possible to change the number of revolutions of the above mentioned shafts 7 and 8.

Furthermore, on one external side 2a the casing 2 is provided with a recessed surface 2b which defines, in the connection with the external side 2a, an outside wall whose corners are rounded off and which, in conjunction with suitable means 16 facing the wall, constitutes a housing 17 in which the flexible cable 9 can fit. In this way it is possible to achieve maximum compactness for the complete group.

Note should also be taken of the fact that the casing 2 is provided with a cover 24 that goes over and closes the front part of the group where the housing 17 is located and the control panel is placed. With reference to FIG. 1, the control panel is made up of a switch 25, with which to excite the alternator, an illuminated satisfactory operation lamp 26, an ammeter 27, terminals 28 and 29 for furnishing electricity, a compressed air delivery point 30, and for the centrifugal pump, a suction point 31 and a delivery point 32.

To conclude, it should be noted that when the alternator 3 is de-energized, that is to say when the switch 25 is in the "off" position, despite the rotation of the shaft 6 of the alternator 3, no energy is supplied, the rotation purely absorbing the power needed to overcome the mechanical no-load losses which, in any case, are negligible.

What is claimed is:

1. Multipurpose externally controlled member device comprising, in one single transportable casing, at least one generator, a compressor and a pump, the mechanical energy required for the operation of the device being supplied by an end of a single flexible shaft, coupling means in said casing engageable with at least one of said members, and control means on said casing for controlling the operation of said coupling means, the other end of said shaft being adapted for connection to an external power takeoff fitted to an engine assembly of a light motorbike.

2. Multipurpose device according to claim 1, wherein said one end of said shaft is directly connected to the generator, said shaft having keyed thereto at least one element for transmitting rotary motion onto rotary motion receiving elements fixedly mounted on shafts of the compressor and of the pump.

3. Multipurpose device according to claim 1, wherein said casing is provided, on one external side, with a recessed surface which defines, in the connection with the external side, a chamber for receiving said flexible shaft.

* * * * *